US005317654A

United States Patent [19]

Perry et al.

[11] Patent Number: 5,317,654

[45] Date of Patent: May 31, 1994

[54] SELECTIVE COLLATING AND INSERTING APPARATUS

[75] Inventors: Alan Perry, Milton Keynes, England; Roger K. Newman, Bishop Waltham, United Kingdom; Robert R. Kruk, Crestwood, Ill.

[73] Assignee: Inscerco Mfg. Inc., Crestwood, Ill.

[21] Appl. No.: 849,231

[22] Filed: Mar. 11, 1992

Related U.S. Application Data

[63] Continuation-in-part of Ser. No. 766,198, Sep. 26, 1991, abandoned.

[51] Int. Cl.$^5$ .............................................. G06K 9/20

[52] U.S. Cl. ........................................ 382/61; 382/48; 209/384; 364/478; 270/58

[58] Field of Search ........................... 382/1, 7, 61, 48; 235/383, 462; 209/584; 395/148; 364/478; 270/54, 56, 58; G06K 9/00, 9/20, 15/00, 7/02; B07C 5/00; G06F 15/20; G06G 7/48

[56] References Cited

U.S. PATENT DOCUMENTS

| | | | |
|---|---|---|---|
| 3,899,165 | 8/1975 | Abrams | 270/54 |
| 3,966,186 | 6/1976 | Helm | 270/58 |
| 4,022,455 | 5/1977 | Newsome | 270/54 |
| 4,523,330 | 6/1985 | Cain | 382/7 |
| 4,544,146 | 10/1985 | Zemke | 270/58 |
| 4,582,312 | 4/1986 | Abrams | 270/1.1 |
| 4,733,856 | 3/1988 | Gunter, Jr. | 270/1.1 |
| 4,800,505 | 1/1989 | Axelrod et al. | 209/584 |
| 4,800,506 | 1/1989 | Axelrod et al. | 364/478 |
| 4,875,668 | 10/1989 | Spyra | 270/45 |
| 4,989,852 | 2/1991 | Gunter, Jr. | 270/56 |
| 5,025,475 | 6/1991 | Okabe | 382/48 |
| 5,033,725 | 7/1991 | van Duursen | 270/52 |
| 5,034,985 | 7/1991 | Keough | 382/7 |
| 5,039,075 | 8/1991 | Mayer | 270/1.1 |
| 5,067,088 | 11/1991 | Schneiderhan | 364/478 |

*Primary Examiner*—Yon J. Couso
*Attorney, Agent, or Firm*—Olson & Hierl, Ltd.

[57] ABSTRACT

An automatic inserting apparatus is provided whereby a primary document and selectively collated secondary documents are assembled and inserted into a mailing envelope. Preferably, the mailing envelope is concurrently imprinted with the name and address of the recipient as shown on the primary document. Each primary document bears a preselected name and mailing address and optionally also a secondary document selecting code. In operation, each primary document is read by an intelligent optical character recognition system, and the information so obtained is used to (a) select all secondary documents designated by the primary document code, after which the primary and secondary documents are combined and folded, and preferably (b) concurrently imprint a mailing envelope using the so-read address.

11 Claims, 10 Drawing Sheets

SELECTIVE COLLATING AND INSERTING APPARATUS

RELATED APPLICATION

This application is a continuation-in-part of our earlier filed U.S. patent application Ser. No. 766,198 filed Sep. 26, 1991, now abandoned.

FIELD OF THE INVENTION

This invention relates to improved automatic document selective collation and envelope inserting apparatus utilizing intelligent optical character recognition means.

BACKGROUND OF THE INVENTION

Various automatic document selective collation and envelope inserting apparatus are known to the prior art. Such an apparatus includes an optical sensor subassembly that detects a collation code which is imprinted in a name and address field appearing on each one of a plurality of serially advanced prime documents, such as, for example, a form letter which has been previously imprinted with an individual name and address of each one of a class of intended recipients.

The collation code, which is typically in the form of a mark sense code or a bar code, incorporates machine readable instructions which, after sensor detection, and conversion into electric signals, direct the selective collation subassembly to associate secondary documents of a preset plurality stored in the selective collator subassembly with each individual prime document. Each resulting document bundle is inserted into a mailing envelope that has a window through which the name and address of the recipient as shown in the field of the prime document is readable. Usually such apparatus is also equipped with a cooperating document folding subassembly.

Recipients of mail which has been so processed have objected to the presence of a collation code in association with their name and address. In fact, recipients of such mail are believed to often regard the presence of a collation code in association with their name and address when seen through an envelope window as evidence that the contents of the envelope constitute mass mailing advertising material which the recipients sometimes discard without review. From the standpoint of, for example, financial institutions which make periodic reports to customers, stockholders and employees, this is an undesirable result.

In addition, the use of windowed envelopes is presently commonplace for mailing of financial statements and the like. Confidential information, such as the account number, balance, etc., may be unwittingly revealed by minor displacement of the document set within the envelope. Such information would be more secure if mailed in a non-windowed envelope.

There is a need for an automatic document selective collation and envelope inserting apparatus which does not require the use of a (non-human) machine readable collation code in association with the name and address of the recipient. The present invention is directed to this need.

BRIEF SUMMARY OF THE INVENTION

This invention provides improved automatic document selective collation and envelope inserting apparatus wherein intelligent optical character recognition means is employed to read all information pre-imprinted in the name and address field appearing on each one of the plurality of prime documents being processed by the apparatus.

The intelligent optical character recognition (IOCR) means includes associated interconnecting means and peripheral means which enable the IOCR means to be functionally associated with existing selective collation and envelope inserting apparatus without elaborate apparatus restructuring or modifying. Indeed, if desired, the selective collation subassembly can be operated with the same computer controller that was formerly employed in using the prior art collation code sensor.

In a preferred embodiment, the IOCR means (when in such functional combination with the other subassemblies of the selective collating and inserting apparatus) make possible the processing of prime documents using only the name and address of the recipient imprinted in a reading field with no associated collation code.

In a presently preferred form, the apparatus of this invention is additionally adapted to insert a duly collated document bundle comprised of a prime document and selected collated secondary documents into a windowless envelope which is imprinted by the apparatus with the name and address of a recipient as shown on the prime document without any associated imprinted collation code.

Although a plurality of IOCR systems are known to the prior art, these systems generally are not adaptable for use with automatic document selective collation and envelope inserting apparatus because of the problems involved. These problems include reliability of recognition, the time required for image processing and generation of output signals from sensed images, compatibility with existing systems, and costs. The IOCR means utilized in the present invention avoids and overcomes these problems.

The IOCR means employed in this invention incorporates both a first synchronous state machine for segmenting a number of images defined in a bit map form into separate pixel groups and a second synchronous state machine to which each pixel group is applied for classification. The first and second synchronous state machines together comprise a recognition engine. The IOCR means also includes new software for operating the IOCR means in functional combination with other apparatus subassemblies.

Other and further objects, aims, features, advantages, purposes, arrangements, embodiments, and the like will be apparent to those skilled in the art from the following description together with the accompanying drawings and appended claims.

BRIEF DESCRIPTION OF THE DRAWINGS

In the drawings, which comprise a portion of this disclosure.

DETAILED DESCRIPTION

Figure 1:
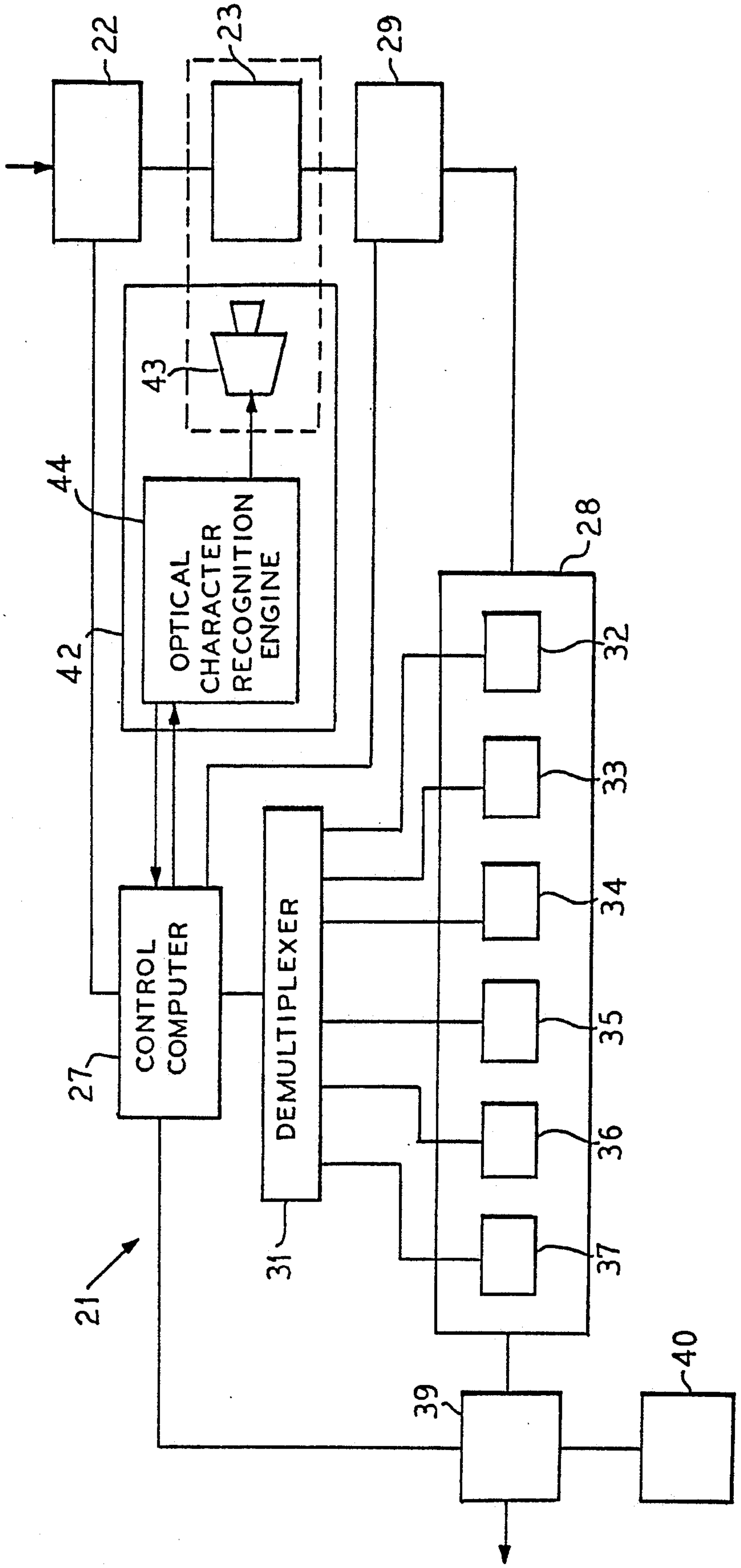
FIG. 1 is a block diagrammatic view of one embodiment of an apparatus of this invention wherein each one of a plurality of prime documents is serially fed, address-field read by a camera equipped IOCR means, folded, selectively collated with secondary documents, and envelope inserted.

Referring to the drawings, FIG. 1 relates to an embodiment 21 of an IOCR-equipped automatic document selective collation and envelope inserting apparatus of this invention shown in block diagrammatic form.

The apparatus functions with a prime document and one or more secondary documents. Each individual prime document, such as a one-page form letter, is individually imprinted within a predetermined field that is located at a predetermined position on the prime document with either (a) the name and address of an individual recipient, or (b) both the name and address of the recipient and an alphanumeric code. Each individual prime document (not shown) is serially advanced as a workpiece by conveyor means through apparatus embodiment 21 in a sequential stop-and-go manner through a series of station stops with each station stop constituting a separate station location at which a work function of apparatus 21 is executed by one or more apparatus 21 subassemblies upon each prime document. The residence time of each prime document at each work station is substantially identical.

At prime document feeding station 22, a prime document at one end of a prime document stack (not shown) is separated and advanced by a sheet feeder or the like (not shown) to a reading station 23. In reading station 23, the name and address field, appropriately illuminated, is read by a scanning video camera 43 in either one of two ways.

In one way, the address field includes, in addition to recipient name and address information, an alphanumeric code that is conveniently printed in adjacent relationship to the name and address information in the name and address field (typically above or below). This alphanumeric code represents specific data regarding particular secondary documents that are to be combined with the prime document in the selective collator 28. This alphanumeric code is read in reading station 23.

In the second way, the name and address information alone is used to represent specific data regarding particular secondary documents that are to be combined with a prime document in the selective collator. Here, the name and address information in its entirety is read in reading station 23.

The so-read image is conveyed in the form of electrical input signals into intelligent optical character recognizer system 42 which converts the input electrical signals into output electrical signals that are representative of selective collating information contained in the so-read image.

These output signals can be used in various ways to control the operation of the apparatus 21 and of its selective collator subassembly 28, as those skilled in the art will appreciate. For one preferred example, these signals are conveniently and preferably fed to a control computer or collator/inserter controller (or control computer) 27 which produces control signals commanding which individual ones of the predetermined group of secondary documents that have been preliminarily loaded into the selective collator 28 (as further described below) ar to be combined with the individual prime document as it passes through selective collator 28 to produce a document bundle. These command electrical signals comprise a serial signal set for each prime document. This set is conveniently temporarily held by the control computer 27 until the prime document whose so read information generated the particular signal set has advanced to the selective collator 28.

After being so read, the prime document in reading station 23 is then advanced to the next following station which in apparatus 21 is a folding station 29. Upon arrival in folding station 29, the prime document is folded in a predetermined manner. For example, a letter sheet can be conventionally folded into three portions with two fold lines such that the opposite end portions of the thus folded letter sheet overlap.

As those skilled in the art will appreciate, the folding station 29 can be eliminated or can be located beyond the selective collator so that all documents of a bundle are conveniently folded together.

From folding station 29, a prime document is advanced into the first collating station 32 of the selective collator 28 which collator is provided with a sequential series of collating stations that in this illustrative embodiment consist of six in all. As a prime document is so advanced, the control computer 27 can be programmed so that a first collating command signal of the signal set for that prime document is forwarded either directly or indirectly (as further described below) to the selective collator 28 and to the first collating station 32 therein. Each command signal of such a set is either a "go" (i.e., collate) or "no go" (i.e., no collate) signal.

A "no go" signal received at first collating station 32 means that no copy of a secondary document plurality that is stored for collation in the first station 32 is selected for placement with the prime document residing in the first station 32, while a "go" signal received at first collating station 32 means that one copy of the secondary document plurality that is stored for collation in the first station 32 is placed with the prime document residing in the first station 32.

The prime document and, if commanded, a thus associated secondary document are advanced from the station 32 to the second station 33 of the selective collator 28, and another signal of the signal set for that prime document (which signal is either "go" or "no go") is received at second collating station 33. Depending upon the nature of the second signal of the signal set, the second station 33 either does or does not combine with the primary document in the second station 32 a copy of the secondary document plurality that is stored in second collating station 33.

Next, the prime document in second station 33 together with any secondary documents that have been thus combined therewith are then advanced to third collating station 34 in the selective computer controller 28. Another (third) control signal of the signal set for that prime document (either a "go" or "no go" signal) is used to control whether or not a copy of a third secondary document plurality that is stored in third collating station 34 is combined with the prime document.

This process is successively repeated at each of the fourth collating station 35, the fifth collating station 36 and the sixth collating station 37. Of course, a selective collator could have more or less than six stations, if desired. An unused station in any actual collating operation (that is, a collating station charged with no secondary document plurality) can merely be given a "no go" signal for each document. Conveniently and preferably, if the prime document is folded before entering the selective collator 28, then each of the secondary documents is conveniently and preferably pre-sized to form a document bundle or set that will fit subsequently into the desired mailing envelope. Thus, the secondary documents of each secondary document plurality can each be preliminarily folded before being loaded into selective collator 28.

From the sixth collating station 37, the final resulting document packet or bundle (not shown) is assembled by selective collation in collator 28. The bundle which consists of primary and selected secondary documents passes into envelope inserting station 39. As each document bundle is charged into station 39, an envelope (not shown) is also charged thereinto from an envelope feeder 40. In station 39, the document packet is inserted by inserter fingers or the like (not shown) into the envelope. The so filled envelope is preferably sealed by the inserter subassembly and is discharged from the inserting station 39, thereby completing one complete operational cycle of the apparatus 21.

The subassembly apparatus employed at each of the foregoing operating stations of apparatus 21, except at reading station 23, is conventional and known to the prior art. For example, suitable such apparatus is utilized in commercially available automatic selective collation and envelope inserting apparatus which is made and sold by the Mailcrafters division of Inscerco Mfg. Inc. of Crestwood, Ill., the assignee of the present patent application.

Figure 2:
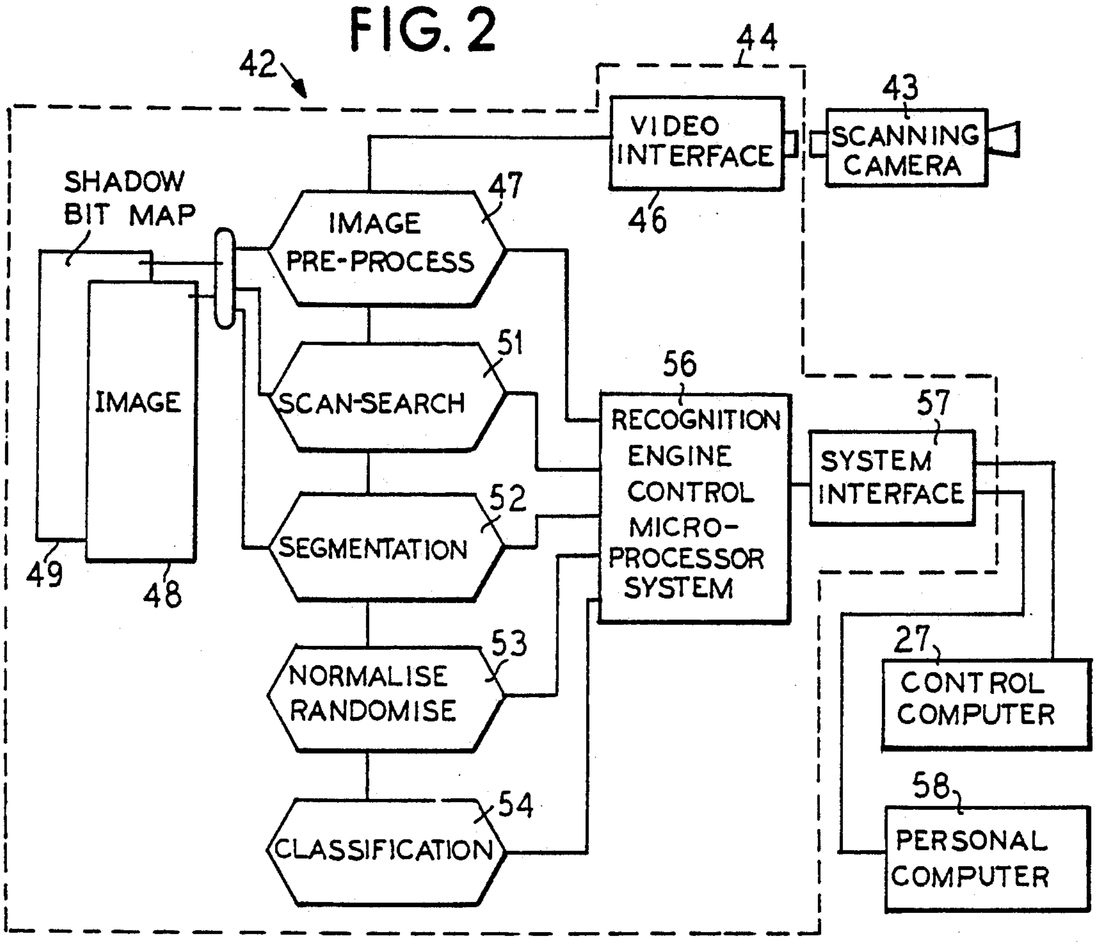
FIG. 2 is a schematic diagram illustrating the intelligent optical recognition system employed in the apparatus embodiment of FIG. 1.

Preferably, the intelligent optical character recognition (IOCR) means that is utilized in the practice of this invention and which is employed in the reading at reading station 23 is adapted from that described in the Etherington, Joslin and Newman patent application identified as EP89910158-8, PCT GB 8901043 and WO90/03012 and also as U.S. Ser. No. 659,385 now abandoned. The teachings of those applications are incorporated herein by reference. This technology and its application to the present invention is now briefly reviewed and described:

A schematic diagram of a representative IOCR system 42 embodying this intelligent optical character recognition technology is shown in FIG. 2. IOCR system 42 incorporates a scanning or video camera 43 which in this embodiment is preferably a charge coupled frame device that provides an image picture that is preferably and exemplarily about 570 by about 450 pixels. Camera 43 is functionally associated through a video interface 46 with a so-called optical character recognition engine 44 which incorporates a high speed trainable logic network that is controlled by a 32 bit microprocessor 56 or the like. In place of camera 43, other embodiments could use a page scanner, a hand held scanner, or a line scan camera.

The recognition engine 44 recognizes images represented by separate digital pixel groups. It utilizes an N-tuple classifier to which each pixel group is presented. This classifier includes a plurality of discriminators each one of which is adapted to recognize a respective class of a predetermined group of classes. The apparatus arrangement is such that each pixel group is presented to the discriminators in a predetermined sequence. Recognition means is provided by monitoring the output of the discriminators. The presentation of each pixel group to the classifier may be terminated as soon as the output from a discriminator satisfies a recognition condition. If none of the discriminator outputs satisfies a recognition condition, the presentation of a given pixel group to the classifier may be terminated after a predetermined time interval.

The apparatus thus incorporates a first synchronous state machine for segmenting a number of images defined in a bit map form into separate pixel groups and a second synchronous state machine to which each pixel group is applied for classification. Engine 44 is thus a synchronous state machine. In a synchronous state machine, the stages of the operating processes are stepped automatically under control of a system clock. A synchronous state machine in applying the N-tuple method of pattern recognition allows the use of a hardware implementation which achieves a much higher speed of image recognition than can be achieved by a predominantly software approach.

The use of the N-tuple method of pattern recognition allows for the discriminators to be trained with different forms of the same shape thus allowing multi-font recognition of the name and address fields.

Camera 43 captures for the name and address field and reference field (if used) of each prime document indicia as images and converts same to digitized video data representing black or white pixel image data captured from the defined field area as a line by line sequence. A video interface 46 digitizes this data and orders such into a form suitable for subsequent data processing. This data is then output from interface 46 to the logic element 47–51 of recognition engine 44 which produces after data processing an electrical output which represents character data that is encoded to a suitable industry standard, such as ASCII (American Standard Code for Information Interchange). The recognized character data is then subjected to pre-determined decision criteria, utilizing the recognition engine control microprocessor. The resultant decisions are then output to a controller, such as control computer 27, through a host system interface 57. Control computer 27 uses this output to control operation of the selective collator 28.

The camera 43 can be any convenient commercially available optical frame camera. Preferably, the camera has an image resolution of at least about 300 dots per inch and a frame scan time of less than about 25 milliseconds to efficiently capture as image so that a high speed of character recognition of at least about 1,000 characters per second is achieved.

In actual fact, the character recognition speed is independent of camera capture time. However, in terms of overall system throughput, it is important that the camera frame capture time is short, as throughput is a function of paper positioning and stop time + camera frame time + recognition time (of the name/address and reference fields) + decision process time. At a document input (feeder) speed of about 12000 sheets per hour, this equates to approximately 300 milliseconds per sheet. Equally, recognition speed has to be fast.

The recognition engine 44 provides for the segmentation and classification functions, as indicated above. These functions comprise processes of breaking each scanned image into separate distinct images for each character, registering the relationship of the individual (segmented) character images and classifying the character images into predefined character classes.

The video data from the scanning camera 43 is interfaced into the recognition unit 44 by a video interface 46. The recognition engine 44, as a present preference, employs a National Semiconductor NS32GX320 microprocessor as its control processor which is fitted with a backplane. The video capture process uses well known (conventional) techniques. In the engine 44, the video data is first fed into an image pre-processing circuit 47 which processes the video data into a RAM (random access memory) that is in the form of an image bit map 48 having a one bit wide data bus.

The image bit map 48 operates in conjunction with a shadow bit map 49 that has pixel locations in a one-to-one correspondence with the pixels of the image bit map 48. The shadow bit map 49 is used to avoid processing the same pixels several times. Such a duplicated processing is utilized in some prior art segmentation schemes.

A scan-search circuit 51 performs a vertical raster scan of the image bit map 48, starting from the top left hand corner of the "page". This scan is to locate potential characters by searching for black pixels which have not been previously processed. This scan in effect performs a search for black pixels not found in the shadow bit map 49. A synchronous state machine segmentation system 52 is used to extract the character shape that is associated with each thus found black pixel.

Each so extracted character shape is fed into a normalize and randomize system function or circuit 53. The character shape is, by this function 53, normalized in size and converted into a random N-tuple form which is then loaded into the buffered input of a synchronous state machine classification system 54. The classification system 54 identifies (classifies) each character that is so presented. The identification of each character is fed into the computer control system 56 for post-processing. The computer control system 56 is also used to control certain aspects of the operation of the recognition engine unit 44. The computer control system 56 preferably employs a commercially available microprocessor which is software controlled, the software mode of operation being shown in FIG. 4 (as hereinbelow described).

Output results derived from the character signal data from recognition engine 54 pass to the host system control computer 27 through the host system interface 57. The interconnection between control computer 27 and recognition engine 44 is conveniently accomplished by data lines (single bit signal lines) and a serial port.

When the prime document reading in station 23 involves an alphanumeric code (as indicated above), the produced character signal data thus output into the control computer 27 is in the form of a signal set which is directly usable by the control computer 27 to control subsequent actions of the selective collator 28 in selectively collating particular secondary documents with each prime document.

When the prime document reading in station 23 involves entire name and address reading (as hereinabove indicated), the produced character signal data thus output is in a form which requires further processing before such data is used by control computer 27 to control subsequent actions of the selective collator 28. This further processing can either be accomplished within engine 44 or within computer 27 with suitable added conventional components being present and functional. If, for example, the computer 27 carries out such further processing, this processing can be variously accomplished.

Thus, for one example, in control computer 27, a look-up table can be prepared and stored. The look-up table comprises both (a) the name and address information of every recipient whose identity and address appear imprinted in the field on each individual prime document to be processed, and (b) the identity of each of the individual selected secondary documents that are to be collated (i.e., associated) with each respective prime document within the entire secondary document class whose members are loaded as respective copy pluralities into the selective collator 28.

For instance, a stack of each individual secondary document can be loaded into a different one of each of the respective collating stations 32, 33, 34, 35, 36 and 37, and each stack (and its component secondary documents) can be assigned a number, such as a binary number. The numbers of the respective individual secondary documents which are to be selectively collated with each recipient prime document are then associated with the name and address of that recipient in the look-up table.

As a general comment, it is possible to operate as above outlined with respect to the look-up table, but in fact we greatly prefer not to do so. A look-up table would work but is probably not always practical from an implementation standpoint due to the size of look-up tables and the time taken to extract collation information. Also, the document provider would have to preprocess and provide look-up table data on some form of transferable media. Instead, it is presently preferred to use an alphanumeric reference field, which is similar to that of the original mark sense codes, if desired, and which is preselected so that inserts can be collated with a prime document, as further hereinbelow discussed. An interface embodiment is hereinbelow presented which illustrates and explains the purpose of the reference field and its interpretation with respect to operation of apparatus 10 (or 88).

The interpreted results from input character data for each prime document is output from the recognition engine 44 and received by the control computer 27 through interface 57. When identification is made, then control computer 27 generates command signals for selective collation of those designated and identified secondary documents with the individual so read prime document. These command signals control the operation of each individual collating station 32–37 as this prime document passes step-wise through selective collator 28.

These resulting command signals for controlling the operation of the collating stations 32, 33, 34, 35, 36 and 37, regardless of the manner of origin, can be transmitted forward from computer 27 and processed for use by selective collator 28 in various ways. For example, computer 27 can have a port C with an 8-bit digital output channel. Multiplexed binary digital control signals output from port C are fed to a demultiplexer 31 which functions to decode the multiplexed binary digital control signals received by it. The decoded signals are then relayed as individual control signals to each of the collating stations 32–37 for operating purposes.

Figure 3:
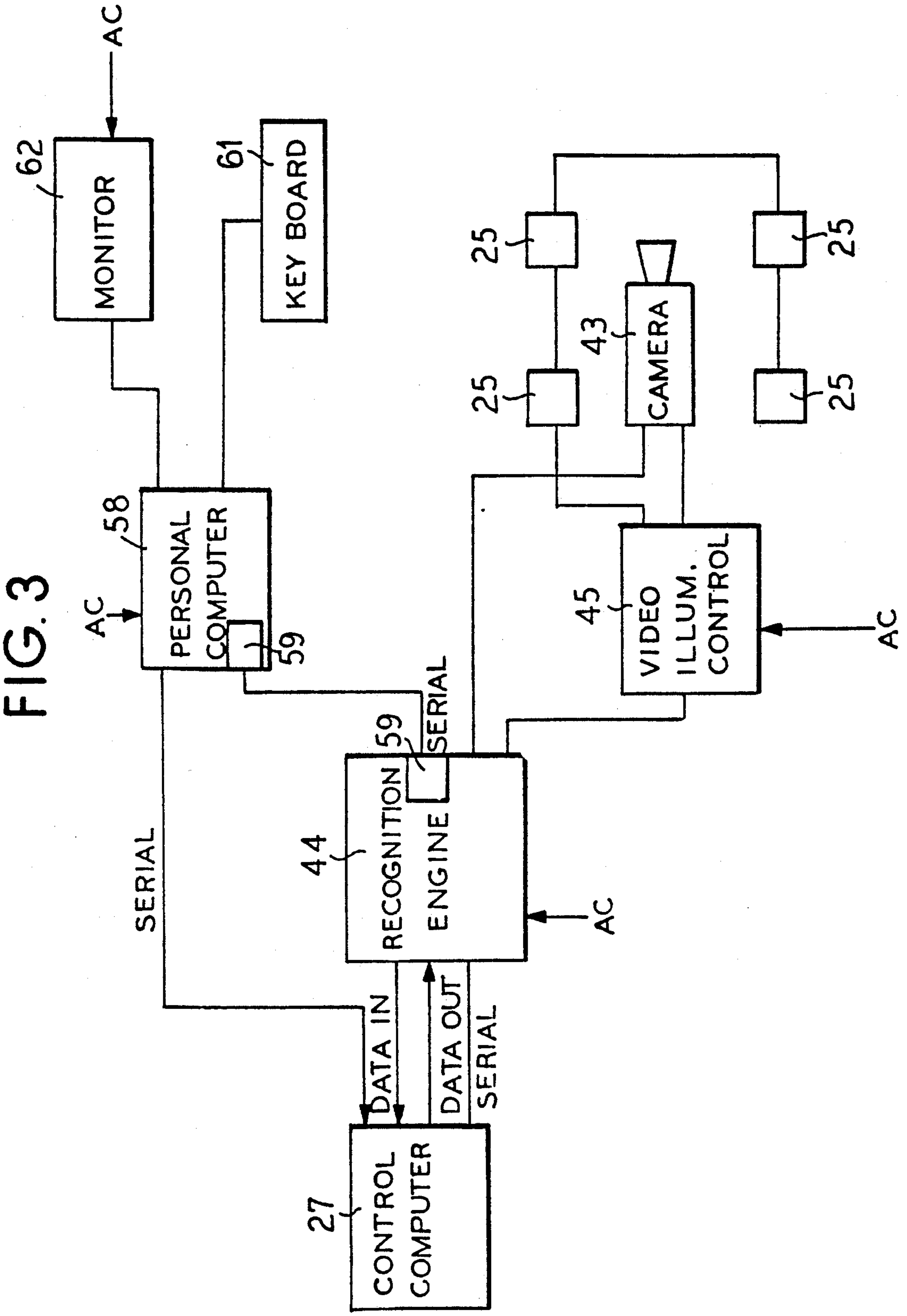
FIG. 3 is a diagram showing the interconnected interrelationship between the IOCR system, the control computer and the peripheral components.

A simplified diagram illustrating the relationship between control computer 27 and recognition engine 44 is shown in FIG. 3. One link (as shown) is provided between control computer 27 and a PC type computer 58 which is a serial data line. This link allows the PC computer 58 to be used as a so called "dumb terminal" in conjunction with the recognition engine 44 software. In FIG. 3, the various interfaces are assumed to be present in the functional interrelationships shown.

The recognition engine 44 as shown, for example, in FIG. 2 and FIG. 3 is further associated with the personal computer 58 (see FIG. 3) through parallel interfaces 59. The personal computer (or PC) 58 can be, for example, a conventional, commercially available desktop device based on an 8-bit microprocessor with 640,000 bytes of memory (ROM or RAM) and input/output ports for connection to associated units. The electronic logic can be housed in a printed circuit board. Computer 58 is additionally associated with a keyboard 61 for data entry with a visual display unit or monitor 62. The interface 59 may be, for example, a commercially available SCSI (Small Computer Systems Interface). In addition, a serial port of the personal computer interconnects with a serial port of the recognition engine 44.

The thus attached computer 58 is used for software and data storage and also to provide a user interface with each of engine 44 and control computer 27. Software is provided which executes in the PC computer 58, to allow the control computer 27 to effectively use the PC monitor screen 62 and keyboard 61 as its user interface when the system is in the operational mode. This allows one to save the cost of a separate dumb terminal for each system.

The recognition engine 44, as also shown, for example in FIG. 3, is associated with a control loop for regulating the light intensity of the lamps 25 that are used to illuminate the prime document name and address field in station 23 and to maintain such lamps 25 at a prechosen level which maximizes the operational efficiency of camera 43.

For example, as shown in FIG. 3, the camera 43 and the recognition engine 44 are functionally associated with an illumination control 45. As the illumination source, a plurality of low voltage miniature quartz halogen lamps 25 numbering from about two to four (four are shown in FIG. 3) can be used. The illumination control 45 conveniently includes a 12 volt d.c. 150 watt switch mode power supply with an added so-called "soft start" circuit. The "soft start" circuit allows the current drawn by the lamps 25 to be slowly ramped up. Without the "soft start" circuit, the lamps 25 could present a short circuit when cold and could damage the power supply when switched on. Video signals from camera 43 are sent to the illumination control 45 and then buffered and/or amplified for forward (onward) transmission to the recognition engine 44 video capture board.

In place of the low voltage quartz halogen lamps, fluorescent illumination (not shown) can be used which removes the need for a separate power supply for a separate lamp power supply and a soft start circuit. Also, video signal pre-amplification can be eliminated by using an alternative mode of camera operation which does not require signal buffering. The need for a pixel clock line is avoided by generating a pixel clock within the recognition engine 44. Further, the video capture board can be changed, if desired, to support a plurality of cameras, such as three, as illustrated for example, in FIG. 2A (as discussed below).

Figure 4:
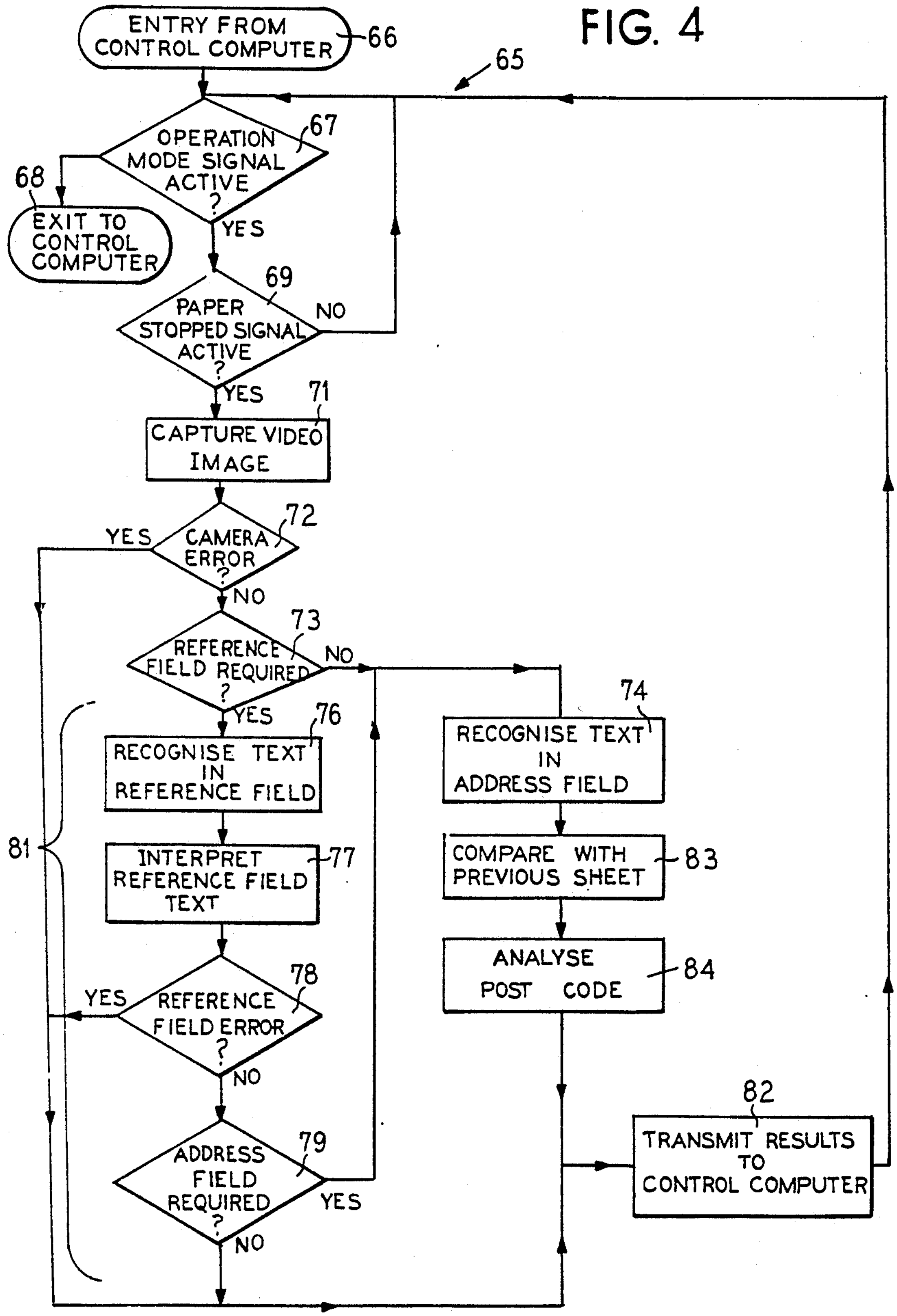
FIG. 4 is a flow diagram illustrating one embodiment of software for operation of the IOCR system shown in FIGS. 1-4.

Referring to FIG. 4, there is seen a flow sheet illustrating one embodiment of a software program 65 specific for the operation of the recognition process that is carried out in the apparatus 21. This flow sheet covers one cycle of operation. Thus, a signal 66 is supplied by host control computer 27 to recognition engine 44 identifying that a prime document is moving into reading station 23. Signal 66 initiates a first internal check step 67 to determine if recognition engine 44 is in an operational mode with its video imaging signal generating capacity active. If such capacity is not active, then the program sequence stops (aborts), and a negative notification signal 68 is given to host control computer 27 from recognition engine 44.

Depending upon the programming of the computer 27, such a negative notification signal can produce one or more results. For example, operation of apparatus 21 can be halted.

If the imaging signal generating capacity is active, then the program sequence advances to the next step 69 where a second internal check is carried out to determine that a paper (the prime document) has duly been advanced into the proper position at the reading station 23 and so is "camera ready" with imaging signal generating capacity active.

An operational mode is normally true for a complete batch run of documents. Thus, once the operational mode is set and there have been no (system) errors to force the operational mode untrue, then the paper stopped signal will be true for each document presented to the camera read station 23 from the document feeder. The purpose of "camera stopped" signal is to ensure that each primary document or paper is stationary before triggering the camera to capture a frame.

If the check step 69 produces a positive (affirmative) result, then the program sequence advances to the next (first functional) step 71 where the name and address data and, if present, the reference field data of the prime document is read by camera 24 and a video image is captured.

Thereafter, the program sequence advances to the next step 72 where a check is carried out to determine if any camera operating error occurred or exists. If not, then the program sequence advances to the next step 73.

If a camera error is detected in check step 72, then the program sequence enters a hold pattern and the program advances to step 82 where an information signal is generated. In this situation, the information signal here generated represents such detected error results and that signal is transmitted to the host control computer 27. All error signals are sent to the host control computer 27 which determines (i) what error message should be displayed via PC monitor screen 62, and (ii) what overall system action should be taken.

Depending upon the programming of the control computer 27, the information signal can produce one or more results. For example, the computer 58 can display the information on monitor 62 and a human operator can decide whether or not the camera 24 is disabled, whereupon, if so, the operator can shut down the entire operational sequence. If, for example, the camera 24 is not disabled, and the camera error is determined to affect only one prime document, then the operator could decide that the operational sequence should continue; and his positive decision can be entered into the system through keyboard 61 whereupon the program sequence of program 65 and the operation of apparatus 21 is continued.

In check step 73, another check is carried out to determine if a reference field is required; see, for example, the description of reference field in the embodiment below presented.

Camera-obtained data comprises:

(a) name, address and zip code (or postal code or like information); and (b) if used, a reference field, as defined below in the embodiment. At set-up time (i.e., batch start time), a decision is made whether the reference field is to be used or not.

The reference field is included in the recognition engine 44 software to accommodate a degree of "backward compatibility" in that it is functionally achieving the same purpose as the original mark sense codification. It is not strictly necessary to use it at all, if only working on name/address and postal code sorting. If, however, inserts are required to be added to the prime document, then the reference field is used.

If it is determined in check step 73 that no reference field is required, then the program sequence advances to the next (second) functional step 74 where the text so read in the name and address field is processed by the recognition engine 44 for recognition as described above. This so read text can constitute only a predetermined region of the entire name and address field on a prime document.

The total camera (frame) data area can be subdivided into windows. One window is conventionally allocated to the name/address and postal code data, and a second (separate) window to the reference field. The camera captures the complete image, i.e., both window areas, but the software of the recognition engine 44 processes only those windows for which it has been set up for a given batch of documents.

If, however, it is determined in check step 73 that a reference field is required, then the program sequence advances to the next succeeding step 76 which is functional. Step 76 is located along a loop 81 of program 65 which is entered only when a reference field is held to be required and step 76 is the first step in such loop. In functional step 76, the read text that occurs only in a predetermined region of the name and address field of the prime document is placed into its position in the reference field which was also read concurrently with text in the name and address field during the execution of the step 71. The reference field is then processed by the recognition engine 44 for recognition as described above. After the recognition step has been so carried out, the program sequence then enters a next succeeding functional step 77 wherein the recognition engine 44 carries out an interpretation of the reference field text.

Thereafter, the program sequence enters a check step 78 where a check is carried out to determine whether or not a reference field error occurred or is detected. If such an error exists, then the program sequence enters a hold pattern, the program advances to step 82, and another type of information signal is generated in step 82. The information signal here represents the error determination and is transmitted to the host computer 27.

Depending upon the programming of the computer 27, such information can produce one or more results. For example, the computer 58 can display the information on monitor 62 and a human operator can decide whether or not to allow the operational sequence of program 65 and apparatus 21 to continue, possibly neglecting or overriding the error determination with regard to reference field error for the one particular prime document that is involved.

If no reference field error is determined to exist in check step 78, then the program sequence proceeds to the next step which s check step 79 wherein an evaluation is made as to whether or not the presence of the name and address field is required (as captured in step 71). If that is required, then the loop 81 is terminated, and the program sequence advances to functional step 74 and the processing as described above.

If the presence of the name and address field is found not to be required in check step 79, then loop 81 is terminated and the next succeeding program sequence step 82 is entered. As a result, an information signal derived from the information read in step 71 and assembled by the recognition machine 44 in steps 76 and 77 is transmitted to the host computer 27.

The name and address field text recognized in step 74 (above) is similarly processed to the processing accomplished in step 76 (above). Thereafter, the program sequence step 82 is entered from step 74 and an information signal derived from the information so read in step 71 and recognized in step 74 is transmitted to the host computer 27. However, between step 74 and step 82, two further successive functional steps are carried out.

One of these further steps is step 83 which involves comparing the recognized text determined in step 74 with the recognized text similarly determined for the preceding prime document that was just previously processed. If the reference field is not used, then successive secondary document (or sheet) prime document matching is done by current and last address comparison. If the name and address match, then the prime document is a multipart set. The last sheet read is held at the fold station so that a multipart set can be collected here. If there is a non-match and no recognition errors are reported (i.e., different prime documents), then the inserter control computer 27 releases the last prime document from the fold station along the track of the inserter 21 and accepts the current prime document (ready to be compared to the next).

The other of these further steps is step 84 which involves an analysis of the postal code contained in the recognized text determined in step 74.

Thus, a service which can be provided by the U.S. Post Office and which is provided by the British Post Office (Royal Mail) allows a discounted postage structure dependent on the degree of pre-sorting done by the originating mailing house (or equivalent) as regards zip code (in the U.S.) or post code (in the U.K.). A maximum discount is given if no additional sorting is needed to be done by the Post Office. Hence, an option is preferably provided (as shown) within the software program 65 to provide postal code sorting.

The signals received by the control computer 27 are processed by the computer 27 in accord with its programmed operational sequence.

Figure 5A:
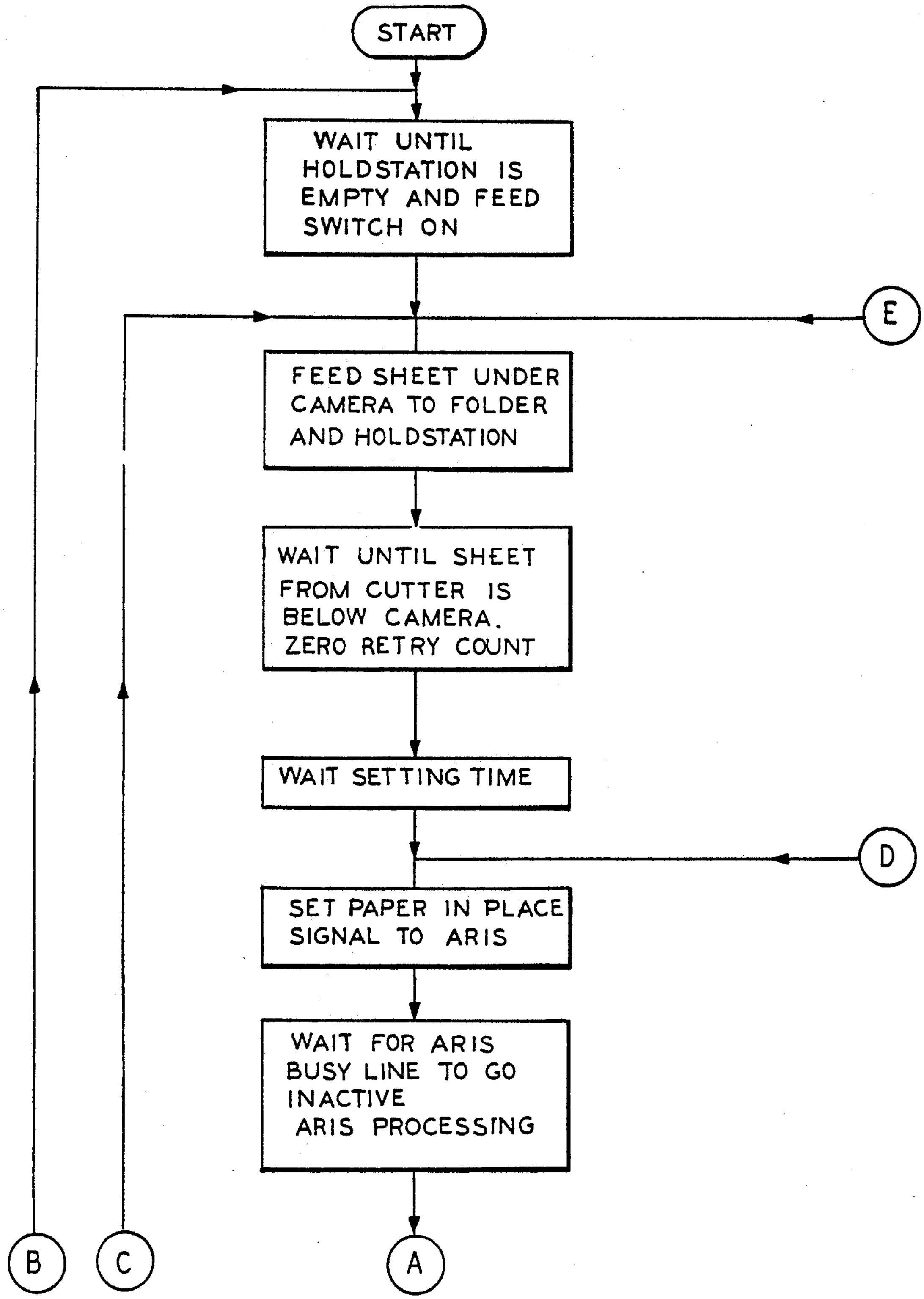
FIGS. 5A and 5B are a flow diagram illustrating one embodiment of software for controlling operation of the apparatus shown in FIGS. 1-4.
Figure 5B:
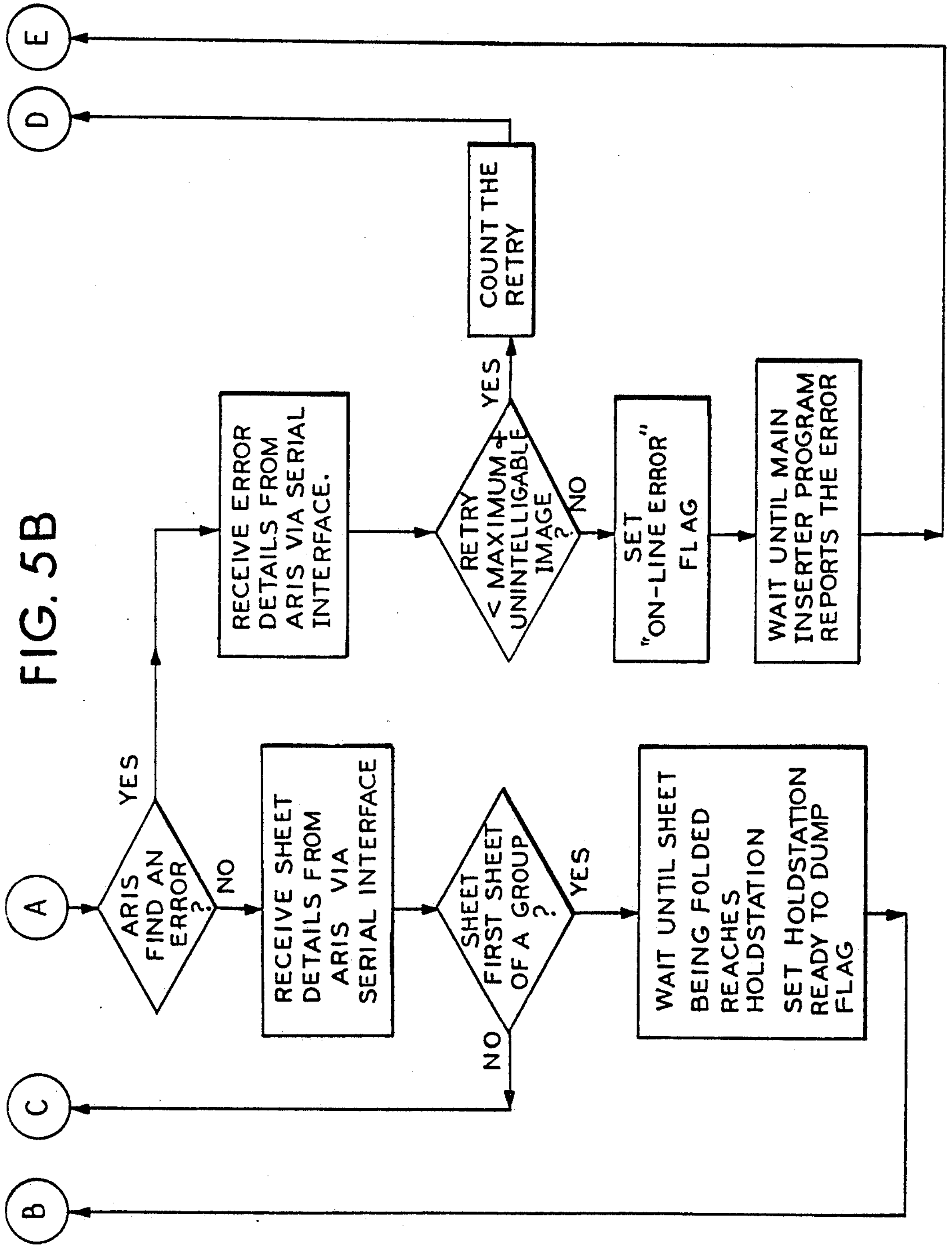

A flow sheet illustrating one embodiment of a software program 86 that is specific for the operation of apparatus 21 using computer 27 is shown in FIGS. 5A and 5B. FIGS. 5A and 5B are believed to be self-explanatory and the program is shown for use with the exemplary embodiment hereinbelow presented.

Figure 6:
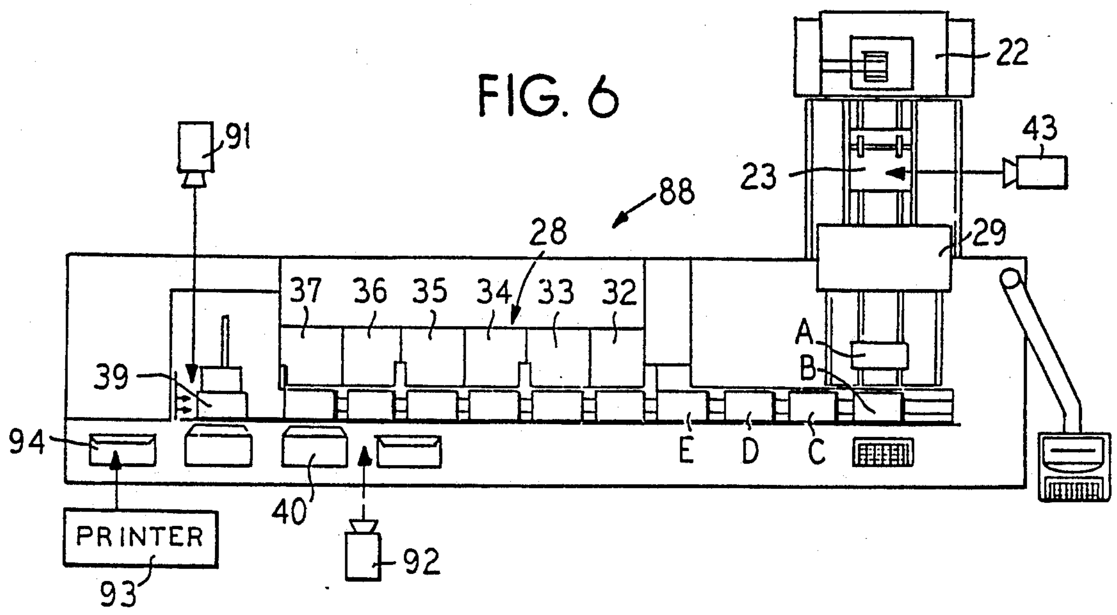
FIG. 6 is a schematic diagram of another embodiment of IOCR-equipped automatic document selective collation and envelope inserting apparatus of FIGS. 1-5 wherein the imprinted recipient name and associated address of each respective prime document is imprinted upon the sealed envelope containing the respective inserted bundle comprised of that prime document so imprinted and associated selectively collated secondary documents.

A presently preferred embodiment of the apparatus of this invention is additionally adapted for the imprinting of windowless envelopes with the name and address of the recipient as shown in the address field of each prime document processed. One embodiment 88 of such a preferred apparatus is shown in FIG. 6. Components of apparatus embodiment 88 which correspond to work stations and subassemblies present in the apparatus embodiment 21 (see FIG. 1) are identically numbered. For simplicity, the intelligent optical character recognition system 42 is not shown in FIG. 6 except for the cameras 43, 91 and 92, as explained below.

An envelope filling (or inserting) station 39 is provided where each succeeding document set is inserted into a different open envelope that is independently successively fed to station 39.

In apparatus 88, a second camera 91 is located at station 39 for reading recipient name and address information showing on each successive prime document. Camera 91 can be similar in construction and operation to camera 43, and camera 91, like camera 43, is functionally associated with recognition engine 44. Camera 91 is preferably the same camera type as camera 43, that is, both are frame cameras.

Figure 2A:
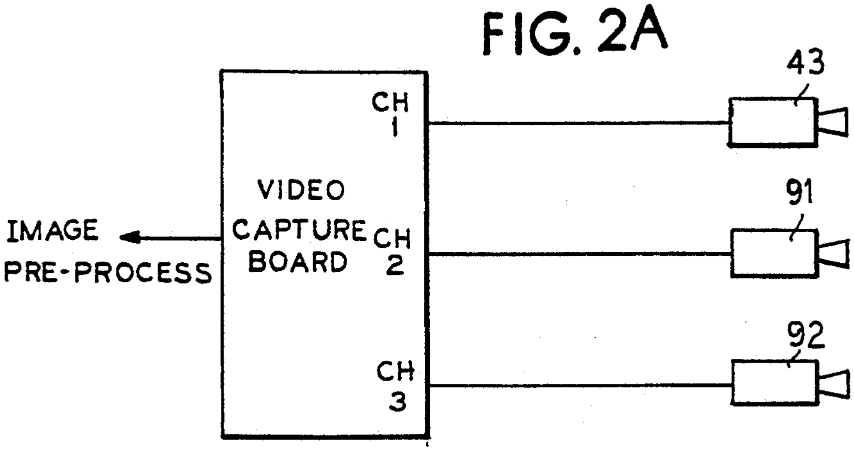
FIG. 2A is a fragmentary schematic diagram illustrating the association of more than one camera with the optical character recognition system of FIG. 2.

The diagram shown in FIG. 2A illustrates the manner in which a second camera 91 and a third camera 92 are connected to the recognition engine 44. For this application, the video capture board comprises three camera input channels, all functionally identical. Captured video image data from each camera is separately buffered (by SRAM) on the video capture board prior to transferring such data to the bit map 48 of the recognition engine 44. Video capture, from a selected camera, is controlled as a software function by software within the recognition engine 44 and in the inserter controller according to the sequence of operation.

A three channel video capture board provides cost effectiveness. It is more economical to allow for a three camera video capture board than to provide three separate recognition engines. Also, the present particular application, with respect to necessary timing sequences for capturing and recognizing data, is such that the (throughput) performance of one recognition engine 44 is sufficient for three cameras.

Camera 91 is employed to print blank windowless envelopes (in place of using windowed envelopes).

Camera 92 is shown merely as an illustrative application. Camera 92 could be used in an application to validate pre-printed envelopes to ensure that each document set is matched to a correctly imprinted envelope.

Camera 91 is utilized to read and produce a video image of the recipient name and address field shown on each prime document of every document bundle or set that is produced in the selective collator 28 just before the document bundle is inserted into an envelope..Envelopes can be sealed at station 39 or before reaching a subsequent station 94.

Camera 91 is optionally but preferably located within the area of station 39. For example, it is preferably mounted under the bed of the inserter apparatus 88 which has a hole cut in it and a transparent plate covering the hole. Thus, the camera 91 points upwards. The name/address data is captured by camera 91 as each document set is momentarily stationary at station 39, having been pushed against a mechanical stop or the like as a part of normal start—stop operation of the envelope inserter at station 39. The reason for capturing name/address data at this point is two-fold:

a) to ensure that the document set (name/address) has been traced down the track of the inserter (i.e., no-one has removed it illegally). This is achieved by keeping a software FIFO (first in-first out) of documents currently being processed on the inserter. The FIFO is updated for each document captured by camera 43 and decremented by each document captured by camera 91.

b) a secondary recognition allows a comparison of recognized data, for a given document, using images captured by a different camera. This information is used to optimize recognition, as software checks can be made on recognized data, using the N-tuple classification method to ensure best performance.

The optimal recognized data, in ASCII text form, is then used as data input to the envelope printer. Cameras 91 and 92 each function in combination with recognition engine 44 in the same manner that camera 43 does.

The output signals produced by the recognition engine 44 from the video image signals made by camera 43 and camera 91 are fed to a printer system 93.

A presently preferred printer system 93 is a high speed ink-jet system such as the "ELMJET" printer available from Elmjet Corporation, Wauconda, Ill. The ELMJET printer system comprises:

(i) a printing head;

(ii) an intelligent print controller; and (iii) a user interface which is actually a PC computer such as computer 58.

Figure 7:
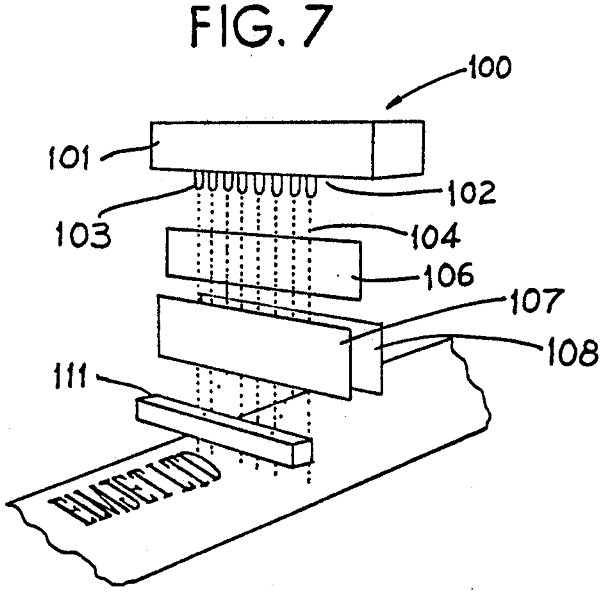
FIG. 7 is a simplified operational diagram of a high speed ink-jet printer suitable for use in the practice of this invention.

An embodiment of such an ink-jet printer or head 100 is shown in simplified form in FIG. 7 and was selected on the basis of best known and available quality of print and speed of operation. As it is a non-impact device, it is relatively easy to add to the system 88 by incorporating such into a print station 93 when system 88 is mainly an existing inserter apparatus, such as is made and sold by Mailcrafters, for example. This printer 100 contains the envelope movement mechanics (a continuous belt, not shown), monitored by a shaft encoder (not shown) which provides clocking signals to a printer controller (not shown) to ensure that printing of each name and address is compatible with the speed of envelope movement.

As shown in FIG. 7, an "ELMJET" type ink jet printer 100 employs an ink reservoir 101 which is provided with a plurality of nozzles 103 arranged in a nozzle array 102. Although eight nozzles 103 are shown for clarity, an array 102 commonly contains about 100 nozzles per 25 millimeters (1 inch). As each ink jet 104 descends, it is acted upon by charge electrode 106. When each jet 104 next passes between a pair of spaced, parallel deflector plates 107 and 108, it is deflected. The deflection accomplished upon individual jets is such that those jets which descend to the target paper surface 109 or the like create a legend which reproduces along the line of the nozzle array 102 a plurality of alphanumeric characters or the like derived from electric signals representative of the starting information (in this case, envelope recipient name and address information) that is impressed upon plates 107 and 108.

The ink jets 104 taken together comprise a curtain. The height of the imaging band matches the overlength of the array 102. The curtain of jets incorporates at any given time many ink droplets (believed to be on the order of millions/sec.), so the potential for ink coverage is large. The deflector plates 107 and 108 accomplish individual droplet deflection electrostatically, enabling drop placement to be extremely accurate. All points are addressable both longitudinally along the array as well as transversely across the array. Printing at high speeds is achieved. Droplets not needed or desired at any given time are charged by deflector plates 107 and 108 appropriate for deflection and collection thereof in a gutter 111.

The printer controller (not shown) converts these so received recognized text signals into command signals which are output to the printer 100 that is functionally associated with a printing station 94. Filled and sealed envelopes from inserting station 39 are serially advanced into printing station 94 at which the envelopes are address imprinted.

From printing station 94, each envelope can be further processed through postage metering means (not shown), if desired.

The subassembly arrangement and configuration of apparatus 88 is advantageous for various reasons. One principal reason is that the addition of the indicated second camera 91, the printer controller, the printer 100, and the foregoing associated auxiliary components can be additions to an apparatus that is already provided with an optical character recognition system 42 as described herein. Thus, the time and costs of extensive equipment modification to accommodate such an automatic envelope addressing subsystem are minimized. Enhanced document security is achieved by the use of windowless envelopes.

Embodiment

The invention is further exemplified by the following apparatus embodiment.

The recognition engine 44 is obtained from HDP Consultant Engineers, Godalming, Surrey, United Kingdom as HDP 32GX320 (also identified as "ARIS"). The inserter apparatus corresponds to Mailcrafters so called "Cube Machine" (also identified as "cube"). The apparatus corresponding to apparatus 21 and 88 comprises a two camera system (cameras 43 and 91). In the following description, for convenience, the collating stations are sequentially numbered.

Dedicated I/O lines

The dedicated I/O lines are defined as "active" when a logic "O" voltage is present on the wire external to both computers 27 and 56. This represents the "current flowing" state in a relay or opto isolator.

Cube Outputs

1. Operation Mode—goes active to indicate that the ARIS should be operational under the control of the Cube, inactive means the ARIS must enter the setup mode and be controlled by its host PC.
2. Paper in Place 1 (station 23)—goes active when a sheet of paper is positioned under camera 43 ready for image capture.
3. Paper in Place 2—goes active when a sheet of paper is positioned under camera 91 ready for image capture.
4. Dump address—this signal is an alternative to Paper in Place 2, when it is active the next address due out of the queue for comparison to that captured by camera 91 will be discarded.
5. Ready for Error Message—when the ARIS has indicated an error, this signal prompts it to send error details over the serial link.
6. Re-transmit—goes active to indicate that the last serial string received by the Cube was garbled, the ARIS responds by re-transmitting the string. The ARIS will monitor this line while awaiting a paper in place signal, further re-transmissions may be prompted by having the signal go inactive then active again.
7. Unacceptable combinations—the ARIS will not expect to see Ready for Error Message or Re-transmit active at the same time as either Paper in Place signals, or Dump Address active at the same time as Paper in Place 2. If either of these combinations occurs then the ARIS will ignore all of the input lines until all six are seen inactive together, after which normal operation will be resumed.

ARIS Outputs

1. Operational—this signal is an acknowledgement of the Operation Mode signal above, when active it indicates that the ARIS is in normal operation mode, inactive means that the ARIS is in setup mode.
2. Busy 1—goes active as an acknowledgement of the Paper in Place 1 (at station 23) signal, goes inactive when all recognition processing is complete, the results are available, and Paper in Place 1 has gone inactive.
3. Busy 2—goes active as an acknowledgement of the Paper in Place 2 signal, goes inactive when all recognition processing is complete, the results are available, and Paper in Place 2 has gone inactive.
4. Error 1—if this signal is active when Busy 1 goes inactive, an error has occurred in the front end (camera 43) operation. Goes inactive in acknowledgement of the Ready for Error Message signal.
5. Error 2—if this signal is active when Busy 2 goes inactive an error has occurred in the back end (camera 91) operation. Goes inactive in acknowledgement of the Ready for Error Message signal.

Serial Link

RS422, 9600 baud, 8 bits, no parity, hardware handshake.

When Busy 1 goes inactive the ARIS will send the following data to the Cube over the serial link, data flow will be controlled by the hardware handshake lines.

Byte 1—Byte count—The number of bytes of data, not including itself or the check byte.

Byte 2—Match number—The reference code for the recognized name and address, this code may be obtained from the printed material or generated by the ARIS, see below.

Byte 3—Miscellaneous.

Bit 0 New Group—1 for the first sheet of a new group.

Bit 1 Sort Code Change—1 for a new sort

Bit 2 Divert—1 if the group is to be diverted.

Byte 4—Inserts 1 to 8—Bit 0 represents a first insert collating station 1, bit 7 an eighth insert collating station, a 1 indicates that the appropriate insert is required.

Byte 5—Inserts 9 to 16—This byte is only transmitted if one or more of the insert subsequent collating stations consecutively numbered 9 to 16 have been requested by the insert code on the sheet.

Check Byte—After the last data byte, the check byte will be sent, and this will have a value such that if all the bytes are transmitted, including the check byte, are exclusive order together then the result will be zero.

Error Messages

An error message is a three byte message transmitted by the ARIS in response to an active level on the Ready for Error Message signal. The first byte is always FFH to distinguish it from a result message, the second byte is the error code, and the third is the checksum based on the previous two bytes.

Error Codes, front end (after Error 1 signal asserted).

1—Unintelligible Image
2—Video Hardware Fault
3—Group Too Large
4—Group Too Small
5—Duplicate Sheet
6—Missing Sheet
7—Ordering Error
8—Mismatch
9—Recognition Hardware Fault
10—Page Count Error Error Codes, back end (after Error 2 signal asserted):

1—Unintelligible Image
2—Video Hardware Fault
9—Recognition Hardware Fault
11—Mismatch
12—Printer Buffer Overflow
13—Printer Alarm

Aris Text Requirements

Name and address field:

The name and address field must be present on the first sheet of any group, it may be omitted on subsequent sheets of the group if a reference field is present which defines the size of the group (see below). When present it must always occupy the same position on all sheets.

The name and address field is allowed a maximum of ten lines and if Post Code (or zip code) monitoring is required, the Post Code must always be the last item on the bottom line. The ARIS will interpret the last but one group of characters on the bottom line as the Post Code group for Sort Code look-up purposes.

Valid characters for the name and address field are "A" to "Z", "a" to "z", "0" to "9", slash, ampersand, colon, semi-colon, round brackets "()", and hyphen. Full stops, commas and apostrophes may be present but will be disregarded by the ARIS.

Reference Field

The reference field is optional, the ARIS must be informed at set up time, by means of the downloaded recognition field set, whether or not to expect one. If present, the reference field must occupy the same location on all sheets, and must be outside the rectangle that fully encloses the name and address window.

Valid characters for the reference field are "0" to "9", "/", and "A" to "Z". The reference field only contains numeric data, the upper case alpha characters are available only to make the reference field appear more natural to the casual reader and are interpreted as numeric characters according to the table below.

TABLE I

| | | | | | | | | | | | |
|---|---|---|---|---|---|---|---|---|---|---|---|
| A | * | B | 8 | C | O | D | O | E | * | F | 2 |
| G | O | H | 5 | I | 1 | J | 3 | K | 4 | L | 4 |
| M | 6 | N | 5 | 0 | O | P | * | Q | O | R | 3 |
| S | 8 | T | 1 | U | 6 | V | 7 | W | 9 | X | 9 |
| Y | 7 | Z | 2 | | | | | | | | |

*"A", "P" and "E" have special meanings and may not be used as pseudo-numerics, see text below.

True numeric characters and pseudo-numerics may be freely mixed and are used according to the format described below.

The format is as follows:

MMM * PN/11

Where MMM is the match code, II the insert code, N the number of pages in the group, and P the page number. In the position marked * the letters "A", "P" or "E" may appear, this position is the divert and/or Sort Code indicator as well as being a field separator.

The match code is the reference for the name and address and must change from group to group. A maximum of six characters are allowed and the resulting number, reduced modulo 256, will be passed to the Cube as a match number. If the match code is omitted the ARIS will generate a new match number each time it detects a new group from comparison of the name and address fields or from page numbering information.

The insert code is a decimal number of up to five digits representing the value of a binary number made up by treating each insert station as a bit (i.e., 4 means use insert station 3, 5 means use insert station 1 and 3, etc.). A value of zero or the absence of the insert code will be interpreted as no inserts required.

The single character denoted by * serves as a field separator and must be one of either "A", "E" or "P". "A" is a null indicator and is treated simply as a field separator, "P" indicates that a new Sort Code should be signalled, and "E" that the group should be diverted. If "E" is present then "P" will be assumed.

The page code consists of one or two characters in the form PN as follows:

N is a decimal number representing the number of pages in the group. P is a decimal number representing the page number of the current sheet within the group. Page numbers must start from one, zero is not an option. If the code only has one digit then it will be interpreted as the page number.

When the N digit is present the name and address field will only be read if P is "1", this will allow the space normally occupied by the name and address to be used for other text on continuation sheets.

The separator characters ("/" and "A") may be omitted if they fall at the beginning or end of the line. Spaces may be inserted or omitted at random, they will be ignored by the ARIS. All fields are optional, but a completely blank reference field when the ARIS is expecting one to be present will cause an unintelligible image error.

Reference Field Examples

174 E 01/23

Match number 174, page 1, insert stations 1, 2, 3, and 5 divert.

23

Generate internal match number on name and address change, no inserts, page 2 of a 3 page group.

XW AIK/17

Match number 99, inserts 1 and 5, page 1 of 4.

AT/IK

Generate internal match number on name and address change, page 1, inserts 2, 3, and 4.

If any reject characters are found in the reference field, or if the number of codes and separators is significantly different from the previous sheet, then an unintelligible image error will be generated.

Error Recovery

Following the generation of an error message, the ARIS will suppress all sequence based errors (3, 4, 6, 7, 8 and 10) until a definite page 1 of a new group is detected.

Mail Sort

Three possible ways are provided to flag a sort code change.

1. A "P" in the reference field.
2. A third recognition window for the sort code.
3. A downloaded Post Code/Sort Code look-up table.

Since the sort code must be visible on the envelope, option one is only useful in a single camera system using windowed envelopes. Options two and three could be used with or without an envelope printer.

For option two, the sort code must be printed on the first sheet of the group within the camera's field of view and must not impinge on the name and address or reference field rectangles. The user must define a sort code recognition window for camera 43 at setup time, the sort code will then be recognized for envelope printing and the new sort code flat raised whenever it changes.

For option three, a look-up table of Post Code groups against sort codes will be derived from the PC disc issued by the Post Office and downloaded to the ARIS at setup time. The ARIS will then derive the sort code from the recognized Post Code group and use this to generate the new sort code flag and the sort code text for envelope printing.

Envelope Inserting and Imprinting

In one illustrative and presently preferred embodiment, camera 43 is used to capture the address field on each prime document, and, if used, the reference field. The image data is then recognized by the intelligent optical character recognition means 42. Reference field information is used, preferably conventionally, for grouping and matching.

In this embodiment, camera 91 recaptures recipient name and address information and reference field information. In each document bundle from collator 28, the recipient name and address is positioned so that it appears upon a bottom face of each of the horizontally oriented document bundles (as they progress serially forwardly from the collator 28). This is arranged either by initially folding each primary document at folding station 29 so that the address field is on an outside surface and the folded primary document remains in this orientation when secondary documents are collated therewith in collator 28, or by placing secondary collated documents in back of each primary document and then folding the resulting document bundle emerging from collator 28 so that the recipient name and address information on the primary document in the folded bundle is located outwards on the lower face of this bundle.

Figure 9:
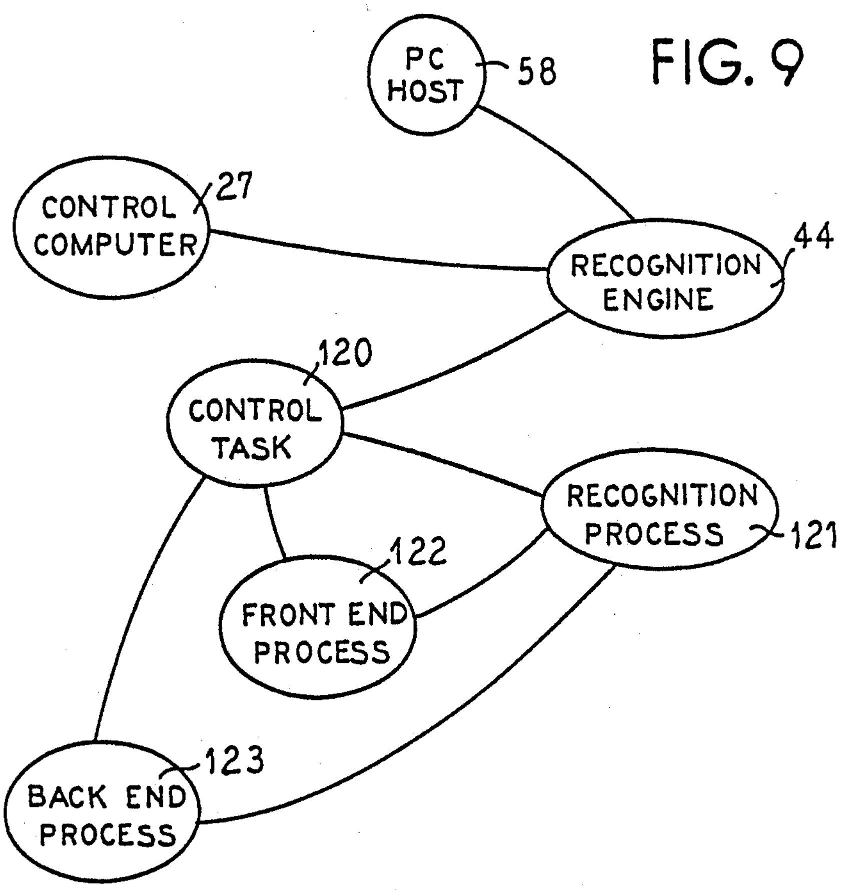
FIG. 9 is simplified diagrammatic view of one embodiment of the integrated complex of processors and processing employed when collating, envelope inserting and envelope imprinting with verification.

The organization and operation of the combination of processors and processing employed in this embodiment is illustrated in FIG. 9. The PC host computer 58 acts as the user interface for on-line inserting; that is, it provides the "dumb terminal" interface for control computer 27. The physical connection that is achieved through the recognition engine 44 is only a matter of convenience in that recognition engine 44 requires the PC host computer 58 also as a user interface for set-up and off-line checks. The recognition engine 44 has a task control function 120 for each of the front end process 122 and the back end process 123 and also for the recognition process 121 which is utilized in each of the front end process 122 and the back end process 123.

The control computer 27 controls preferably conventional and standardized functions executed by collator 28 and envelope inserter 39. In addition, control computer 27 routes I/o data to, and accepts I/o data from, recognition engine 44. Also, control computer 27 has a serial link dialogue with recognition engine 44 in this embodiment. Further, control computer 27 exerts a master or primary control over operations at print station 94.

Recognition engine 44 can be regarded as a processor executing a control task with a number of asynchronsous processes. These significant processes are:

(1) a common optical character recognition processing activity;

(2) a so-called "front end" process handling control of image capture and processing of the recognized data from camera 43; and (3) a so-called "back end" process handling control of image capture and processing of the recognized data from camera 91.

The "back end" process handling control is also inclusive of the verification process to ensure that a correct address for a given document set is printed on the appropriate bland windowless envelope so that each such envelope is one in which a known (usually identically addressed) document set or bundle is inserted.

Figure 10:
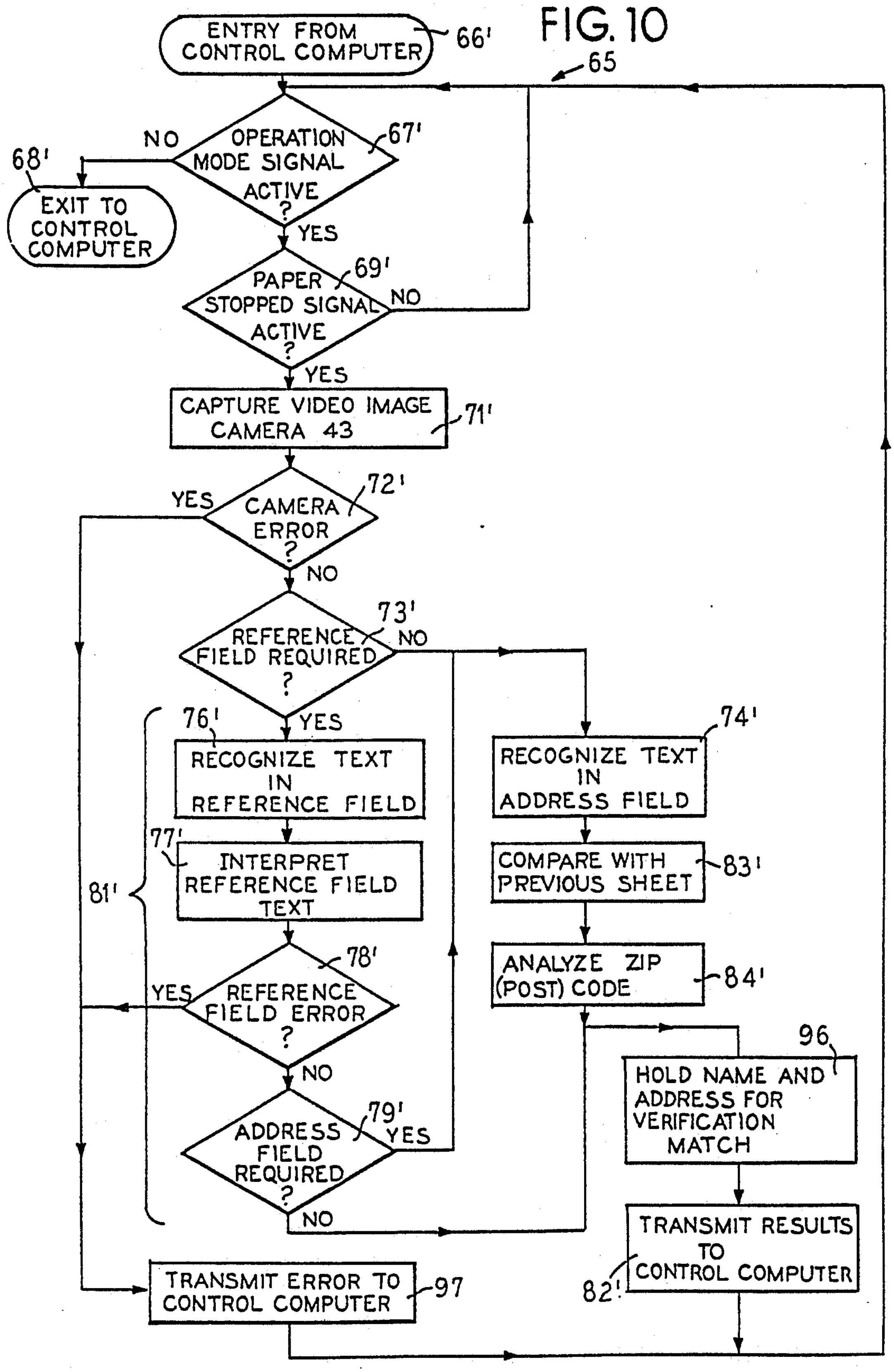
FIG. 10 is a flow diagram of an embodiment which is similar to the flow diagram of FIG. 4, but which has been adjusted for "front end" handling control of image capture and processing of recognized data from camera 43 of FIG. 6.

The flow chart of FIG. 10 illustrates software suitable for executing the process identified as (2) above. FIG. 10 is similar to FIG. 4, and step functions in FIG. 10 that correspond approximately to step functions in FIG. 4 are similarly numbered but with the addition of prime marks (') thereto for identification purposes. In addition, in the flow chart of FIG. 10, an error transmission step function 97 is included so that an error that is detected in either of steps 72' or 78' can be conveyed to control computer 27. Also, in the flow chart of FIG. 10, a holding step function 96 is included where recognized recipient name and address information is held (as determined from each serially processed prime document)

for subsequent usage in verification matching as part of the envelope inserting and/or envelope imprinting sequence.

Figure 11:
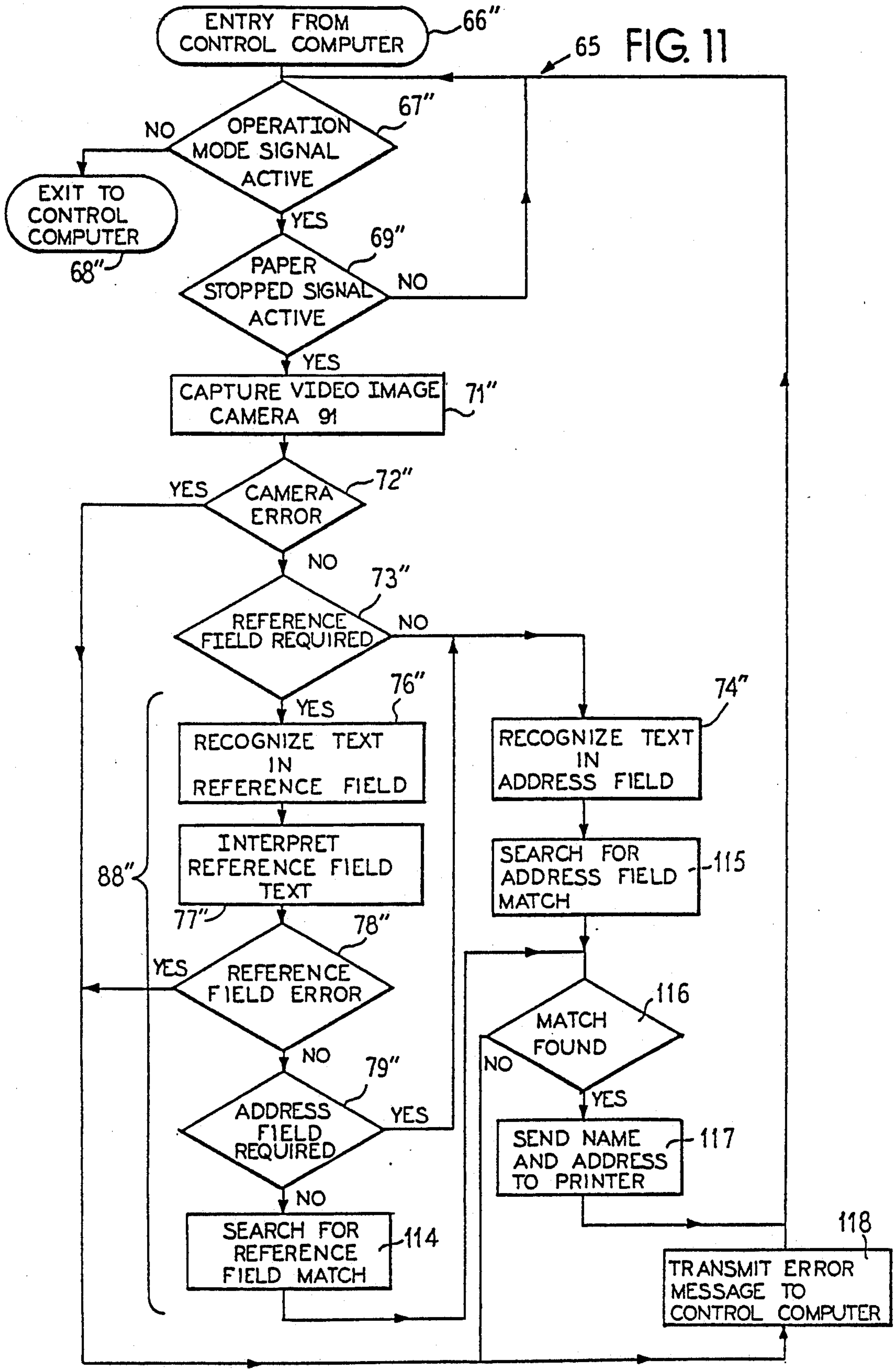
FIG. 11 is a flow diagram of an embodiment which is similar to the flow diagram of FIG. 4, but which has been adjusted for "back end" handling control of image capture and processing of the recognized data from camera 91 of FIG. 6.

The flow chart of FIG. 11 illustrates software suitable for executing the process identified as (3) above. FIG. 11 is also similar to FIG. 4, and step functions in FIG. 11 that correspond approximately to step functions in FIG. 4 are similarly numbered but with the addition of double prime marks (") thereto for identification purposes. In addition, in the flow chart of FIG. 11, steps 83 and 84 are eliminated from the FIG. 4 step sequence while the following new steps have been added:

(a) Between step 79" and step 74", a function step 114 is inserted for a search for reference field matching (step 114 is used when no address field is required).

(b) After step 74", a function step 115 for a search for address field matching is inserted (step 115 is used when an address field is required).

(c) After steps 114 and 115, a check step 116 is inserted to identify whether or not a match has been found as a result of the performance of one of the alternatively performed steps 114 and 115.

(d) After step 116, a function step 117 is inserted so that a "yes" result found from step 116 can be conveyed to control computer 27.

(e) After steps 72", 78" and 116, a function step 118 is inserted so that, if and when an error is detected (as a "yes" in each of steps 72" and 78" and as a "no" in step 116), then an error message is transmitted to control computer 27.

In the execution of each of steps 114 and 115, recognized text derived from camera 43 and processed by recognition engine 44 is compared by the IOCR system 42 to recognized text derived from camera 91 and processed by recognition 44.

A series of checks are thus carried out by the software to ensure that:

(i) optimal recognition of recipient name and address data through intelligent comparative checking of recognition data using both camera 43 and 91 is achieved in order to print correct data on each windowless blank envelopes using printer 93 at station 94; and (ii) the correct recipient name and address is printed on each blank envelope for a given document set (that is, to be sure that the envelope contents match recipient and address information imprinted thereon).

Figure 8:
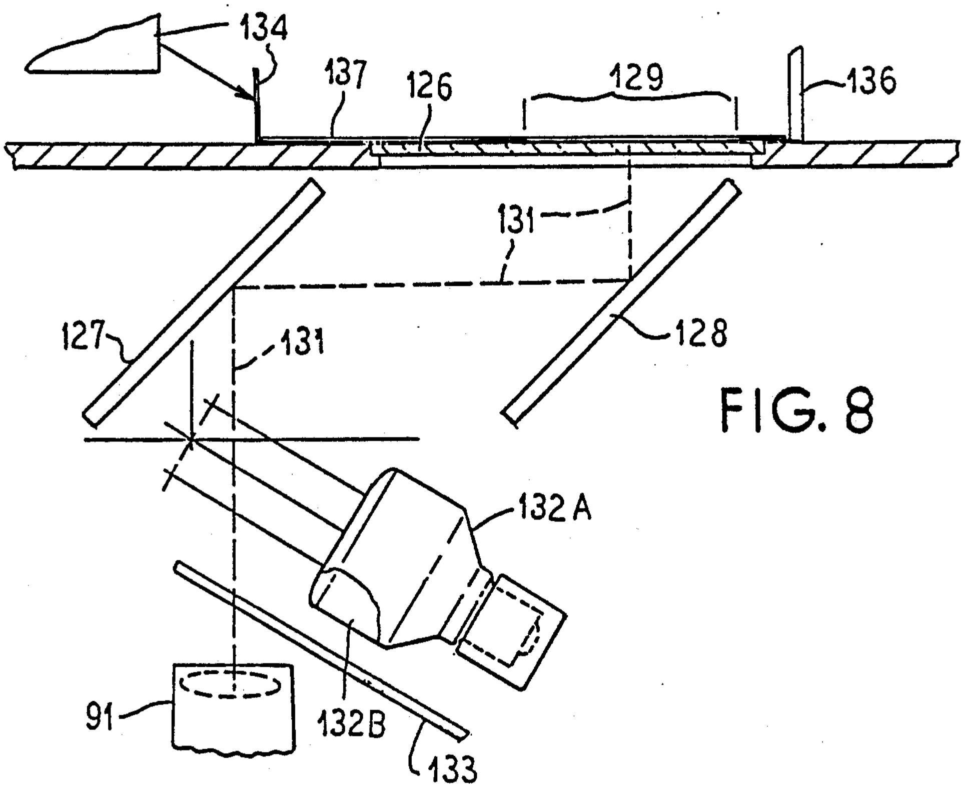
FIG. 8 is a simplified vertical longitudinal sectional view through one embodiment of the viewing station for image capture using camera 91 of FIG. 6.

As above indicated, the axis of camera 91 points upwardly. However, as shown in FIG. 8, for equipment structural reasons, it is necessary to mount camera 91 in a position that is offset from the clear glass plate 126 that is positioned along the collated document bundle travel path following station 39 and upon the upper surface of which each document bundle is brought to a stop. Two mirrors 127 and 128, each mounted at 45° C. in spaced, parallel relationship to the other, are used to permit camera 91 to view a preset location 129 on glass plate 126 which location 129 corresponds to the area occupied by the address field and reference field associated with one (lower) face of each document bundle 137 on plate 126. The viewing light path is shown by the dotted lines 131. As a light source for location 129, a pair of lamps 132A and 132B (such as an Osram Dulux 11W lamp) is employed (one lamp being directly behind the lamp 132 shown in FIG. 8 and also being in spaced, parallel relationship thereto so that camera 91 views location 129 therebetween). Each lamp 132 is oriented at an angle different from 45° (for example 30°) so that the travel path of light therefrom does not fall (through reflection) upon the lens of camera 91 yet the location 129 is illuminated to a desired extent that is at least sufficient for good imaging (in the same manner as accomplished at station 23). A filter plate or polarizing plate 133 optionally but preferably can be diagonally oriented over the lens area of camera 91 to substantially eliminate stray light for enhancing the capability of camera 91 for achieving image sharpness and clarity.

A conventional mechanical document bundle advance system 134 (not detailed) is here employed for document bundle regulated movement onto plate 126 and a mechanical stop 136 (conventional, not detailed) is used to control positioning of each document on plate 126. The "paper stopped" decision is presently detected by mechanical means which automatically triggers an exposure by camera 91 without software intervention. However, as those skilled in the art will readily appreciate, alternatively, the paper stopped position can be sensed and the imaging by camera 91 can be operated by control by software.

Various modifications, alterations, changes and improvements in the herein disclosed and described invention may be made without departing from the spirit and scope thereof.

What is claimed is:

1. Apparatus for serially selectively collating each one of a plurality of individual prime documents each having imprinted recipient address information with respective individual non-addressed secondary documents selected from a preset plurality of different individual said secondary documents in which copies of individual said secondary documents are each organized into respective sets, comprising in combination:

(a) means for serially advancing in a stop-and-go manner each one of said plurality of prime documents along a processing route with each successive stop position corresponding to a different work station on said route;

(b) means for executing a different work functions at each successive said stop position, said work function executing means comprising:

(1) serial feeding means at a first said work station on said route for serially advancing into said route individual ones of said prime documents from said plurality of prime documents, (2) intelligent optical character recognition means at a second successive said work station on said route for reading said address information on each successive said prime document and for converting the so read information into representative output signals, said intelligent optical character recognition means including (a) first video camera means for imaging said address information in a raster field and for converting said so imaged information into black and white video data comprised of pixels, and (b) an N-tuple classifier means that (i) incorporates a plurality of discriminators each adapted to recognize a respective class of a predetermined group of classes of said video data, each said class being represented by a group of said pixels, and (ii) presents each said pixel group to said discriminators in a predetermined sequence, and (3) a plurality of individually actuatable collating means, each one being associated with a different respective successive said work station on said route after said second work station, each one holding a different said set, and each one being operable to combine one copy of its so held said individual secondary document with each successive said prime document when said prime document is in said associated work station; and (c) computer means for regulating apparatus operation and for selectively operating individual ones of said collating means responsive to said output signals; thereby to produce from said address information on each said prime document a document bundle comprised of that prime document and selected individual said secondary documents of said secondary document plurality.

2. The apparatus of claim 1 wherein said serially advancing means is adapted to advance each said document bundle which results from passage through said collating work stations to a subsequent envelope inserting work station and wherein envelope inserting means is provided to insert each succeeding said document bundle into a different respective envelope.

3. The apparatus of claim 2 wherein:

(a) said intelligent optical character recognition means further includes second video scanning camera means associated with said N-tuple classifier for reading said recipient address information on each prime document and said N-tuple classifier means converts said so read information into second output signals representative thereof; and (b) an envelope imprinting work station is included at one stop position and printer means is associated therewith, said printer means including controller means, and said controller means is responsive to said second output signals;

so that each said envelopes is imprinted by said printer means with said recipient address information that occurs on individual respective prime documents of each said document bundle.

4. The apparatus of claim 3 wherein said intelligent optical character recognition means further includes third video scanning camera means for reading said envelope imprinted recipient address information for validating that each respective so imprinted envelope and prime document of each said document bundle which is being inserted into such imprinted envelope both have the same recipient address information.

5. An apparatus for inserting selected documents into an in situ addressed envelope comprising in combination:

(a) means for serially advancing each one of a plurality of primary documents along a processing route in a stop-and-go manner, each primary document bearing a recipient name mailing address information and also a secondary document selecting code;

(b) intelligent optical character recognition means including (1) first video camera means at a first stop location along said route for reading said selecting code on each primary document and for converting said selecting code into video data comprised of pixels, and (2) an N-tuple classifier that is in functional association with said first video camera means and that (i) incorporates a plurality of discriminators each adapted to recognize a respective class of a predetermined group of classes of said video data, each said class being represented by a group of said pixels, and (ii) converts for each primary document said secondary document selecting code into electrical output signals that are representative thereof;

(c) means at each of a series of subsequent second locations along said route for holding and supplying selectively at each respective said location one of a predetermined plurality of secondary documents with an individual predetermined prime document when said predetermined prime document is at such respective location, each said second location having a different plurality of said secondary documents, and for combining secondary documents so selected at individual ones of said respective locations with said predetermined prime, document, each successive one of said predetermined prime documents having a said selecting code which corresponds to those said so selected secondary documents that are so combined with each said predetermined prime document, thereby to form after said predetermined prime document has progressed on said processing route past said series of second locations a document set with each individual said predetermined prime document;

(d) means at a subsequent stop location along said route for folding each said document set into a bundle;

(e) said intelligent optical character recognition means further including second video camera means at a subsequent stop location along said route for reading said recipient name and mailing address information on each primary document and for converting said recipient name and mailing address information into respective electrical signal outputs representative thereof;

(f) means at a subsequent stop along said route for advancing and imprinting a mailing envelope with the so-read recipient mailing address information responsive to each said signal output representative thereof;

(g) means at a subsequent stop location along said route for inserting each said so folded document set into that respective so addressed envelope whose imprinted address corresponds to the address appearing on the primary document that is included in said bundle that is being inserted therein; and (h) computer control means for regulating and synchronizing the operations of each of said serial advancing means, said intelligent optical character recognition means, said holding and supplying and combining means, said folding means, said envelope advancing and imprinting means, and said inserting means, said computer control means being regulated by said respective representative electrical signal outputs.

6. The apparatus of claim 5 wherein said optical character recognition means further includes third video camera means for reading said recipient name and address information on each said so imprinted envelope to validate that each bundle is matched to each said so imprinted envelope.

7. A method for preparing a mass mailing comprising the steps of:

(a) serially advancing each one of a plurality of primary documents along a processing route in a stop-and-go manner, each individual primary document bearing recipient address information that includes a secondary document selecting code that specifies which members of a predetermined secondary documents plurality are to be collated with each said individual primary documents, and carrying out the following successive steps:

(b) reading by intelligent optical character recognition each said individual primary document, said reading being carried out by the steps of:

(1) imaging said recipient address information with a video camera means in a raster field and converting said so imaged information into black and white video data comprised of pixels, (2) organizing said pixels into groups, (3) presenting said pixel groups to a plurality of discriminators in an N-tuple classifier in a predetermined sequence thereby to recognize said secondary document selecting code, and (4) converting said so recognized selective code into representative control electrical signals;

(c) selectively collating individual secondary documents with each said individual primary document in accord with said control signals from among said predetermined plurality of secondary documents thereby to produce with each said individual primary document a document bundle comprised of one said individual primary document and said individual selectively collated secondary documents; and (d) inserting each of said resulting document bundles into a different individual respective envelope.

8. The method of claim 7 wherein each said primary document is folded after being so read and before being selectively collated with said secondary documents.

9. The method of claim 7 wherein in addition:

(a) each individual said envelope is imprinted with an address which corresponds to the address shown on one said primary document; and (b) each respective collated document bundle is inserted into the so-imprinted envelope which bears the same imprinted address that is associated with the primary document in said document bundle.

10. The process of claim 9 wherein said imprinting is carried out after said inserting.

11. The process of claim 9 wherein said imprinting is carried out before said inserting.

* * * * *